March 27, 1956 — A. A. MEYER — 2,739,684
POLE PIECE UNIT FOR MAGNETS
Filed Jan. 21, 1955 — 2 Sheets-Sheet 1
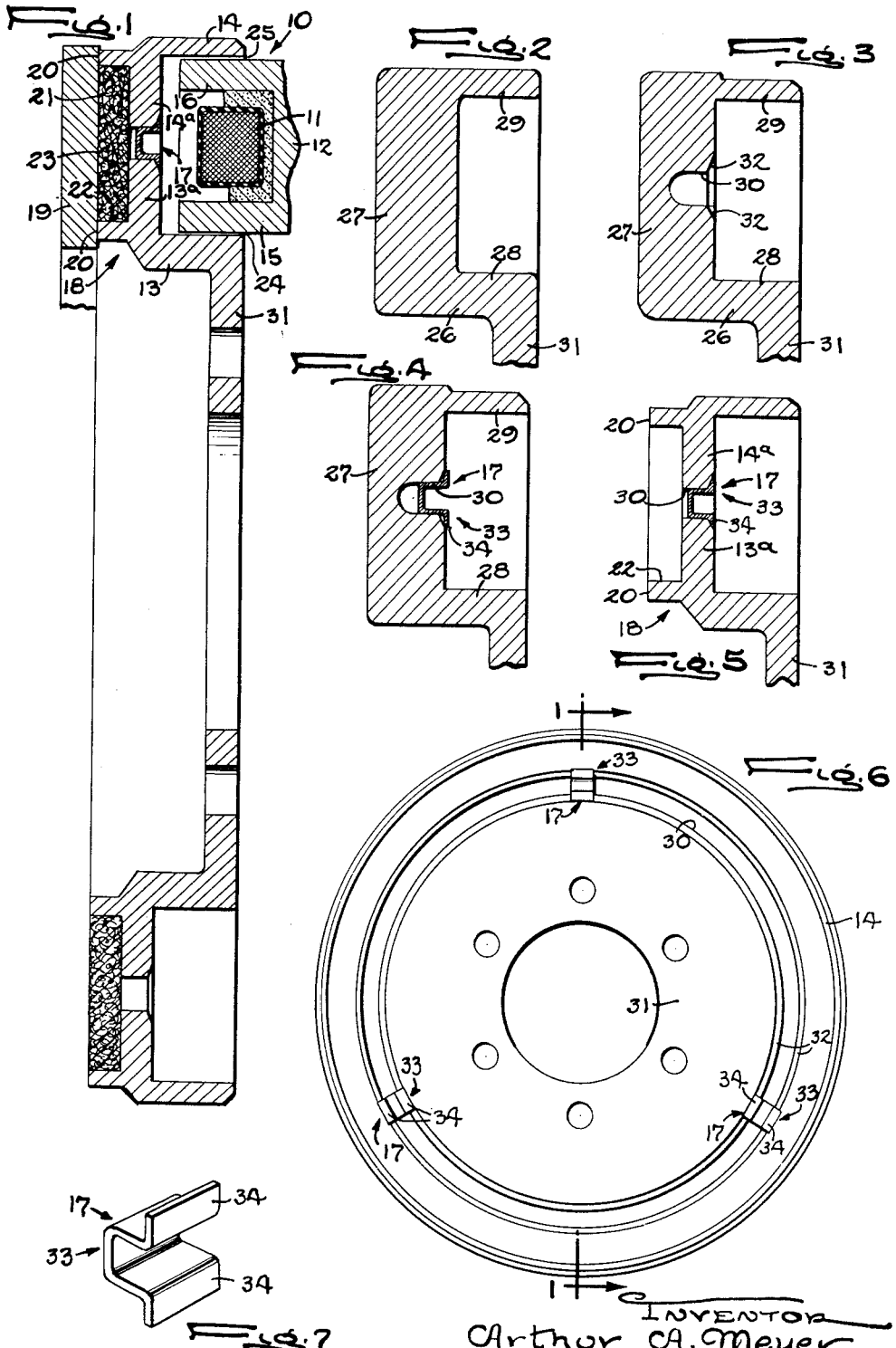
INVENTOR
Arthur A. Meyer
By Carlson, Pitzner, Hubbard & Wolfe
ATTORNEYS March 27, 1956     A. A. MEYER     2,739,684
POLE PIECE UNIT FOR MAGNETS
Filed Jan. 21, 1955     2 Sheets-Sheet 2
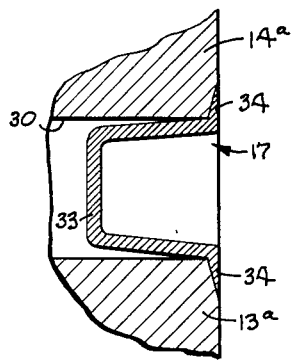
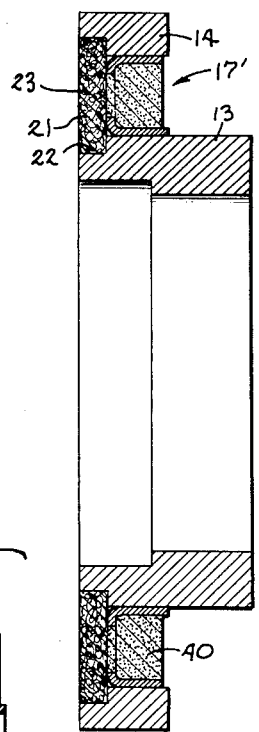
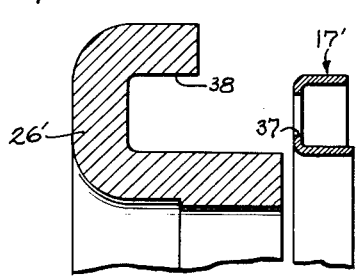
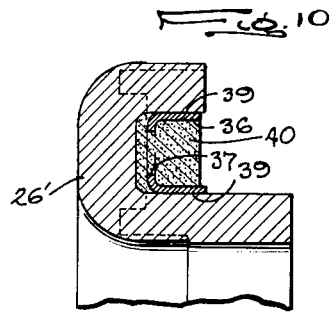
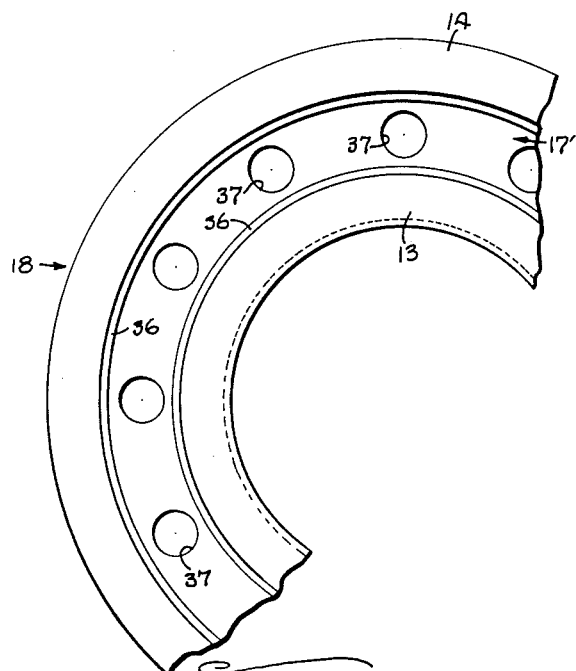
INVENTOR
Arthur A. Meyer
By Carlson, Pitzner, Hubbard & Wolfe
ATTORNEYS United States Patent Office 2,739,684
Patented Mar. 27, 1956

2,739,684

POLE PIECE UNIT FOR MAGNETS

Arthur A. Meyer, Beloit, Wis., assignor to Warner Electric Brake & Clutch Company, South Beloit, Ill., a corporation of Illinois Application January 21, 1955, Serial No. 483,229

6 Claims. (Cl. 192—84)

This invention relates to annular magnets whose pole pieces are formed by radially spaced concentric rings which telescope with the pole projections of a toroidal magnet core and are magnetically separated but rigidly connected by a spacer of high reluctance material so that the rings and the spacer constitute a separate pole piece unit. More particularly, the invention relates to a pole piece unit which is made by joining the spacer to a magnetic annulus between the edge portions of the latter and then cutting away a part of the annulus to form separate pole pieces joined by the spacer.

The general object is to provide a pole piece unit of the above character which remains unaffected by differential thermal expansion of the parts during service use or initial manufacture.

The invention also resides in the novel construction of the ring connecting element which permits integral joining thereof with the pole rings as by welding.

Other objects and advantages of the invention will become apparent from the following detailed description taken in connection with the accompanying drawings, in which—

Figure 1 is a fragmentary longitudinal sectional view taken along the line 1—1 in Fig. 6 and showing a clutch with a pole piece unit embodying the present invention.

Figs. 2, 3, 4 and 5 are fragmentary sectional views similar to Fig. 1 illustrating the steps employed in making the pole piece unit.

Fig. 6 is an end view of the pole piece unit.

Fig. 7 is a perspective view of the spacer.

Fig. 8 is an enlarged fragmentary view of a part of Fig. 4.

Figs. 9, 10 and 11 are sectional views similar to Figs. 3 to 5 showing a modified construction and its manner of formation.

Fig. 12 is a fragmentary face view of the modified construction.

As shown in the drawings for purposes of illustration, the invention is embodied in an annular electromagnet 10 which includes a multiple turn energizing coil 11 wound within a core 12 which is a ring of magnetic material with a U-shaped radial cross section. Inner and outer rings 13 and 14 of magnetic material telescope respectively with the inner and outer legs 15 and 16 of the core 12 and constitute the pole pieces of the magnet. The pole rings are radially spaced apart but are joined rigidly together by a connecting element or spacer 17 composed of metal such as stainless steel which forms a flux barrier of relatively high reluctance while joining the rings to form a rigid unit 18. Herein, the pole ring 13 includes a radial flange 13a projecting outwardly from the ring intermediate the ends thereof while the ring 14 includes a similar flange 14a projecting inwardly toward the flange 13a. The spacer 17 is joined to the ends of these flanges which are disposed relatively close together.

Magnets of the foregoing type are especially suited for electromagnetically controlled friction clutches and brakes. In the clutch shown in the drawings, for example, the core 12 is stationarily mounted while the pole piece unit 18 is supported for rotation and constitutes one element of the clutch. The other element is formed by a flat annular armature 19 bridging the pole faces 20 on the outer ends of the rings 13 and 14. Segments 21 of friction material are pressed into an annular recess 22 between ends of the pole rings on which the pole faces are formed and in front of the flanges 13a and 14a which thus serve as a backing for the segments. The latter are flush with the pole faces and present a friction face 23 to the armature 19. The inner or telescoping end portions of the pole rings are spaced slightly from the corresponding legs of the core 12 to define narrow annular radial gaps 24 and 25.

When the coil 12 is energized, magnetic flux threads the substantially closed path from the leg 15 of the core 11 across the gap 24, through the pole ring 13, the armature 19, the pole ring 14 and back to the core across the gap 25. Such flux draws the armature into gripping engagement with the friction face 23 to derive the desired clutching action.

In some instances, the pole rings 13 and 14 are made by cutting away metal from a single annular shell 26 (Fig. 2) to separate the inner and outer edge portions thereof. Before such separation, the spacer 17 is joined to the parts of the shell which ultimately become the pole rings so that the latter remain rigidly connected after being divided. Herein, the shell 26 comprises a flat ring 27 with radially spaced flanges 28 and 29 projecting axially from the inner and outer peripheries of the ring. In other words, the shell is U-shaped in radial cross section with the flanges 28 and 29 forming the legs of the U.

The pole piece unit 18 may be manufactured simply and inexpensively by first forming an annular groove 30 (Fig. 3) in the shell 26 on one side of the ring 27, inserting the preformed spacer or connecting element 17 in the groove, joining the spacer to the shell on opposite sides of the groove, and finally cutting away the metal from the other side of the ring 27 down to the bottom of the groove to divide the shell into the two pole rings 13 and 14 which remain rigidly connected by the spacer.

Considering now the form of the invention shown in Figs. 1 to 8, a plurality of the spacers 17 are employed in each pole unit, these being angularly spaced apart and each comprising a relatively narrow strip 33 of metal such as stainless steel bent into a U-shape. With stock of about .05 of an inch thick forming a channel section about a quarter of an inch wide and 3/16 of an inch deep, the desired rigidity of the connection may be achieved with three connecting elements spaced equidistantly around the pole rings as shown in Fig. 6. At the free ends, each leg of the channel is formed with a short flange or lug 34 turned outwardly and at a right angle.

Preparatory to securing the spacer channels 17 in place on the shell 26, the groove 30 is cut on the side of the ring 27 between the flanges 28 and 29. The groove extends around the entire circumference of the shell and is made substantially deeper than the axial thickness of the spacer 17 so that the latter projects only part way into the groove as shown in Fig. 4. Preferably, the flanged side of the ring 27 is machined at this time and the outer ends of the walls of the groove are chamfered or beveled as indicated at 32 in Fig. 3. If desired, the surfaces of the legs 28 and 29 opposing the magnet core 11 and defining the gaps 24 and 25 as well as the outer surface of the outer leg 29 and the back of the mounting flange 31 may be machined before inserting the spacer.

After being positioned in the groove, each channel 33 is bonded or secured rigidly to the shell 26 on opposite sides of the groove. While such fastening may be achieved in various ways involving heating of the parts to be joined a welding operation is preferred. Herein the flanges 34 are spot welded to the bevel surfaces 32 of the shell over substantially the entire areas of the flanges. As a result, the material forming the flanges flows in against the bevels and is integrally united with the latter leaving the spacer flanges flush with the back side of the shell as illustrated in Fig. 5.

With the spacers thus inserted in the groove 30 and welded to the shell 26, metal is removed as by a turning operation from the flat side of the ring 27 to cut through to and somewhat beyond the bottom of the groove and divide the shell into two parts which constitute the pole rings 13 and 14. Preferably, this cut is made as an incident to the formation of the recess 22 for the wear segments 21, that is, the recess is made deep enough to extend through to the groove. The wear material then is pressed into the recess and the front of the composite annulus is machined in a standard facing operation to provide a flat friction face 23 composed of the pole faces 20 and the segments 21. The end portions of the pole rings 13 and 14 adjacent the friction face are also turned down in the same operation to the desired thickness and shape as shown in Fig. 5 to complete the pole piece unit 18.

Where greater rigidity of the high reluctance connection between the pole rings is desired, the circumferential lengths of the connecting elements may be increased or the elements may be united into a complete annulus as shown in Figs. 9 to 12. Here, the channel shape of the spacer indicated at 17' is retained and the outturned flanges at the free edges of the cylindrical channel flanges or legs 34 are omitted. In this instance, the spacer is stamped from metal such as stainless steel and shaped to fit snugly between the inner and outer surfaces of the pole rings 13 and 14 themselves. Preferably holes 37 are punched in the bottom of the channel at angularly spaced points therearound.

For use with the modified connecting channel, the magnetic shell 26' is formed as a ring of J-shaped cross section as shown in Fig. 9 with a groove 38 therein of substantially the same width as the spacing of the pole rings 13 and 14 in the final unit 10. The annular channel 17' is inserted in the groove to a point short of the bottom thereof as shown in Fig. 10 and, at several angularly spaced points 39, each of the channel flanges 36 is secured as by spot welding to the opposed walls of the groove. The welds 39, usually four on each flange, are spaced as far as possible from the closed end or bottom of the channel and near the free edges of the flanges.

To increase the mechanical stability of the final assembly, the channel 17' after attachment to the shell is filled with a suitable potting compound 40 which will set or harden after molding, a material known as Coil Seal No. 11 made by National Engineering Products, Inc. being suitable for this purpose when mixed with a filler such as talc. Preferably the filler is pressed through the holes 37 so as to completely fill the space between the bottom of the groove 38 and the channel 17'. Then, as before, the metal on the opposite side of the shell 26' is cut away down to the dotted line in Fig. 10 which leaves the unit 18 in final form shown in Fig. 11.

In both forms of the invention as described above, it will be observed that the spacers 17 or 17' provide high reluctance connections between the pole rings 13 and 14 and rigidly join the same at a plurality of angularly spaced points. At the same time, the connection is formed by a metallic channel integrally secured to the respective rings at points which are spaced far enough from the channel bottom to preserve the inherent lateral collapsibility of the latter. Thus, when the outer ring becomes heated to a temperature greater than the other ring and thus expands in diameter, the channel will open up or expand as shown in Fig. 8 without the welds or other attachment areas being strained or subjected to shearing stresses of objectionable magnitudes. All possibility of breaking the welds under conditions of differential thermal expansion of the pole rings is thus avoided. Such differential heating may occur during manufacture or while the spacer is being subjected to the heat of welding. Or the difference in heating may take place in service use of the clutch or brake due to the greater peripheral speed of the outer pole face and the resulting development of greater frictional heat in the outer pole ring. After dissipation of the temperature difference, the channel of course assumes its normal shape with the channel flanges substantially parallel and lying close to the opposed surfaces of the pole rings.

In addition, the pole piece unit 18 constructed as described above is comparatively simple and inexpensive to manufacture. The stamped sheet metal spacer is joined to the pole rings simply by cutting the groove 29 in the shell 26, and welding to the groove walls at a plurality of points. Since the spacers are located and attached to the pole rings before the latter are separated by machining, the handling of the parts during the welding operation is greatly simplified and extreme accuracy in the final relation of the pole faces is easily attained.

I claim as my invention:

1. A magnetic pole structure having, in combination, inner and outer rings of magnetic metal having radially spaced opposed surfaces defining an annular groove between the rings, and means providing high reluctance connections between said rings and rigidly joining the same at least at a plurality of angularly spaced points and each connection comprising a channel composed of metal having a thermal expansion characteristic different from said rings, said channel closely fitting in said groove with the flanges of the channel lying against said surfaces, and thermally formed joints integrally uniting the free edges of the channel to said inner and outer rings while leaving the closed edge of the channel and the adjacent major portion of said flanges free for expansion and contraction during heating and cooling of the ring and channel assembly.

2. In a magnet, the combination of, two tubular rings of magnetic material forming pole pieces terminating at one end in axially facing pole faces substantially flush with each other, a bridge element of lesser magnetic permeability than said rings spanning the latter and holding the same in radially spaced relation, said element being U-shaped in radial cross section with the sides of the channel lying against opposed inner surfaces of said rings, and means rigidly uniting said side legs to said rings at points axially spaced along the rings from the closed end of the channel.

3. A magnetic pole structure having, in combination, inner and outer rings of magnetic metal having radially spaced opposed surfaces defining an annular groove between the rings, and means providing a high reluctance connection bridging and rigidly joining the same and comprising a channel composed of metal having an expansion characteristic different from said rings, said channel closely fitting in said groove with the flanges of the channel lying close to said surfaces, and thermally formed joints integrally uniting the free edges of the channel to said inner and outer rings while leaving the closed edge of the channel and the adjacent major portion of said flanges free for expansion and contraction during heating and cooling of the ring and channel assembly.

4. In a magnet construction, the combination of, two rings of magnetic material providing at one end axially facing pole faces lying in a common plane, arcuate segments of nonmagnetic friction material spanning said rings between said pole faces and providing a surface flush with the faces, radial flanges formed on said rings intermediate the ends of said rings and providing a backing for said friction segments, the opposed edges of said flanges forming the opposed walls of a narrow annular groove, a member of channel cross section disposed in said groove with the bottom of the channel adjacent said segments and the channel flanges lying against said walls, and means bonding the free edges of said channel flanges to said ring flanges to complete a rigid high reluctance connection between said rings.

5. A magnetic pole structure having, in combination, inner and outer rings of magnetic metal having radially spaced opposed surfaces defining an annular groove between the rings, and means providing a high reluctance connection between said rings and rigidly joining the same and comprising a channel composed of metal having an expansion characteristic different from said rings, said channel closely fitting in said groove with the flanges of the channel lying against said surfaces, lugs bent outwardly around the edges of said surfaces, and joints integrally uniting said lugs to said inner and outer rings.

6. A magnetic pole structure having, in combination, inner and outer rings of magnetic metal having radially spaced opposed surfaces defining an annular groove between the rings, and means providing high reluctance connections between said rings and rigidly joining the same and comprising an elongated arcuate channel having concentric substantially cylindrical flanges and composed of metal having an expansion characteristic different from said rings, said channel closely fitting in said groove with the flanges of the channel lying against said surfaces, and thermally formed joints integrally uniting the free edge portions of the channel to said inner and outer rings.

References Cited in the file of this patent

UNITED STATES PATENTS

| | | |
|---|---|---|
| 2,039,714 | Fuller | May 5, 1936 |
| 2,695,687 | Anderson | Nov. 30, 1954 |